(12) United States Patent
Yao (10) Patent No.: US 11,093,057 B2
(45) Date of Patent: Aug. 17, 2021

(54) FLEXIBLE TOUCH DISPLAY PANEL AND FLEXIBLE TOUCH DISPLAY APPARATUS

(71) Applicant: Shanghai Tianma Micro-Electronics Co., Ltd., Shanghai (CN)

(72) Inventor: Qijun Yao, Shanghai (CN)

(73) Assignee: Shanghai Tianma AM-OLED Co., Ltd., Shanghai (CN)

( * ) Notice: Subject to any disclaimer, the term of this patent is extended or adjusted under 35 U.S.C. 154(b) by 0 days.

(21) Appl. No.: 15/637,732

(22) Filed: Jun. 29, 2017

(65) Prior Publication Data

US 2018/0253175 A1    Sep. 6, 2018

(30) Foreign Application Priority Data

Mar. 1, 2017 (CN) .......................... 201710117453.6

(51) Int. Cl.
  *G06F 3/041*    (2006.01)
  *G06F 3/044*    (2006.01)
(52) U.S. Cl.
  CPC .......... *G06F 3/0412* (2013.01); *G06F 3/0445* (2019.05); *G06F 3/04166* (2019.05);
  (Continued)
(58) Field of Classification Search
  CPC ........... G06F 2203/04102; G06F 2203/04107; G06F 2203/04112
  See application file for complete search history.

(56) References Cited

U.S. PATENT DOCUMENTS 9,871,149 B2 * 1/2018 Woo ................... H01L 31/05
2012/0098782 A1 * 4/2012 Nam .................. G06F 3/0445
                                                    345/174
(Continued)

FOREIGN PATENT DOCUMENTS

CN   104216598 A   12/2014
CN   204314857 U    5/2015
(Continued)

OTHER PUBLICATIONS

Chinese Office Action for application No. 201710117453.6; reported on Feb. 3, 2019.
(Continued)

*Primary Examiner* — William Boddie
*Assistant Examiner* — Bipin Gyawali
(74) *Attorney, Agent, or Firm* — von Briesen & Roper, s.c.

(57) ABSTRACT

A flexible touch display panel is provided. The touch display panel includes: a flexible substrate; a light emitting unit layer disposed on the flexible substrate, including a plurality of light emitting units; a first touch electrode layer; a second touch electrode layer; and an insulation layer disposed between the first touch electrode layer and the second touch electrode layer, the first touch electrode layer includes a plurality of first touch electrodes insulated from each other, the first touch electrodes are strip-shaped, extend along a bending axis of the display panel; the second touch electrode layer includes a plurality of second touch electrodes insulated from each other, the second touch electrodes are strip-shaped, extend along a direction perpendicular to the bending axis and are arranged along the bending axis. The first touch electrode layer is a transparent conductive layer, the second touch electrode layer is metal mesh.

9 Claims, 5 Drawing Sheets

(52) U.S. Cl.
CPC .............. *G06F 2203/04102* (2013.01); *G06F 2203/04107* (2013.01); *G06F 2203/04112* (2013.01)

(56) References Cited

U.S. PATENT DOCUMENTS

| | | | | |
|---|---|---|---|---|
| 2015/0070309 A1* | 3/2015 | Kang | .................... | G06F 3/0445 345/174 |
| 2015/0145824 A1* | 5/2015 | Park | ........................ | G06F 3/044 345/174 |
| 2015/0293629 A1* | 10/2015 | Ryu | ....................... | G06F 3/0446 345/174 |
| 2016/0103526 A1* | 4/2016 | Sohn | .................... | G06F 3/0445 345/174 |
| 2016/0202816 A1 | 7/2016 | Park | | |
| 2016/0378224 A1* | 12/2016 | Kwon | .................... | G06F 3/044 345/174 |
| 2017/0031482 A1* | 2/2017 | Yoshiki | .................. | G06F 3/0446 |
| 2017/0192574 A1* | 7/2017 | Koike | ..................... | G06F 3/044 |
| 2017/0228052 A1* | 8/2017 | Nakamura | .......... | G06F 3/03545 |
| 2017/0262112 A1* | 9/2017 | Noguchi | ............. | G02F 1/13338 |
| 2018/0033834 A1* | 2/2018 | Jun | ........................ | G06F 3/0412 |
| 2018/0136784 A1* | 5/2018 | Liu | ........................ | G06F 3/0412 |

FOREIGN PATENT DOCUMENTS

| | | |
|---|---|---|
| CN | 106409149 A | 2/2017 |
| WO | WO2016039047 A1 | 3/2016 |

OTHER PUBLICATIONS

Chinese Office Action for application No. 201710117453.6; reported on Sep. 11, 2019.
Indian First Examination Report related to IN Application No. 201734025326 reported on Sep. 26, 2019.

* cited by examiner

FLEXIBLE TOUCH DISPLAY PANEL AND FLEXIBLE TOUCH DISPLAY APPARATUS

CROSS-REFERENCE TO RELATED APPLICATION

This application claims priority to Chinese Patent Application No. CN2017/10117453.6 filed on Mar. 1, 2017, the disclosure of which is incorporated herein by reference in its entirety.

TECHNICAL FIELD

The present disclosure relates to a display field, and more particularly to a flexible touch display panel and a flexible touch display apparatus.

BACKGROUND

At present, it is generally necessary for a flexible display panel adopting an organic light emitting diode (OLED) to be laminated with a touch module layer, so as to realize a touch function. Therefore, the flexible display panel cannot be slim. In order to achieve a slim flexible display panel, a traditional module lamination technology is replaced with an integrated technology. In the current integration technology, a touch electrode is mainly integrated in a protective film layer, a polarizer or a cover glass, or integrated in a thin-film encapsulation layer. Through the above manner, the flexible display product becomes thinner to a certain extent. However, there is a very small distance between a touch electrode and a display unit because the touch electrode is integrated in the display panel, causing signals of the touch electrode to be interfered with by display signals. Therefore, the touch accuracy is affected.

SUMMARY

In view of the above, according to one aspect of embodiments of the present disclosure, a flexible touch display panel is provided. The flexible touch display panel includes:
    a flexible substrate;
    a light emitting unit layer disposed on the flexible substrate, the light emitting unit layer includes a plurality of light emitting units;
    a first touch electrode layer disposed on a side, which is facing away from the substrate, of the light emitting unit layer;
    a second touch electrode layer disposed on a side, which is facing away from the light emitting units, of the first touch electrode layer; and
    an insulation layer disposed between the first touch electrode layer and the second touch electrode layer;
    the first touch electrode layer includes a plurality of first touch electrodes, the first touch electrodes are strip-shaped, extend along a bending axis of the flexible touch display panel and are arranged in a direction perpendicular to the bending axis;
    the second touch electrode layer includes a plurality of second touch electrodes, the second touch electrodes are strip-shaped, extend along the direction perpendicular to the bending axis and are arranged along the bending axis; and
    the first touch electrode layer is a transparent conductive layer, and the second touch electrode layer is metal mesh.

According to another aspect of an embodiment of the present disclosure, a flexible touch display apparatus including the above flexible touch display panel is provided.

Through setting the first touch electrode layer as a transparent conductive layer, the flexible display panel and the flexible touch display apparatus provided by the present disclosure can shield signal interference of the light emitting units below to the touch electrodes, thereby ensuring the touch stability of the flexible touch display panel. Moreover, the first touch electrode layer includes the plurality of first touch electrodes which are insulated from each other, and the first touch electrodes are strip-shaped, extend along the bending axis of the display panel and are arranged along the direction perpendicular to the bending axis, the transparent conductive layer is not affected by the bending of the flexible display panel, and the bending resistance of the first touch electrode layer is increased while the shielding effect of the display signal is guaranteed. Meanwhile, the second touch electrode layer is set as the metal mesh, so that the bending resistance of the entire touch display panel is improved, and the touch stability of the flexible touch display panel in folding and bending states is guaranteed.

BRIEF DESCRIPTION OF DRAWINGS

FIG. 1b is a cross-sectional diagram along AA in FIG. 1a.

DETAILED DESCRIPTION

The present disclosure will be described in further detail with reference to accompanying drawings and embodiments. It is to be understood that specific embodiments described herein are only illustrative of the present disclosure and are not intended to limit the present disclosure. In addition, for the sake of convenience of description, only parts related to the present disclosure, but not all parts, are shown in the accompanying drawings. Meanwhile, for the sake of clarity, the same reference numerals are used in different accompanying drawings.

Figure 1A:
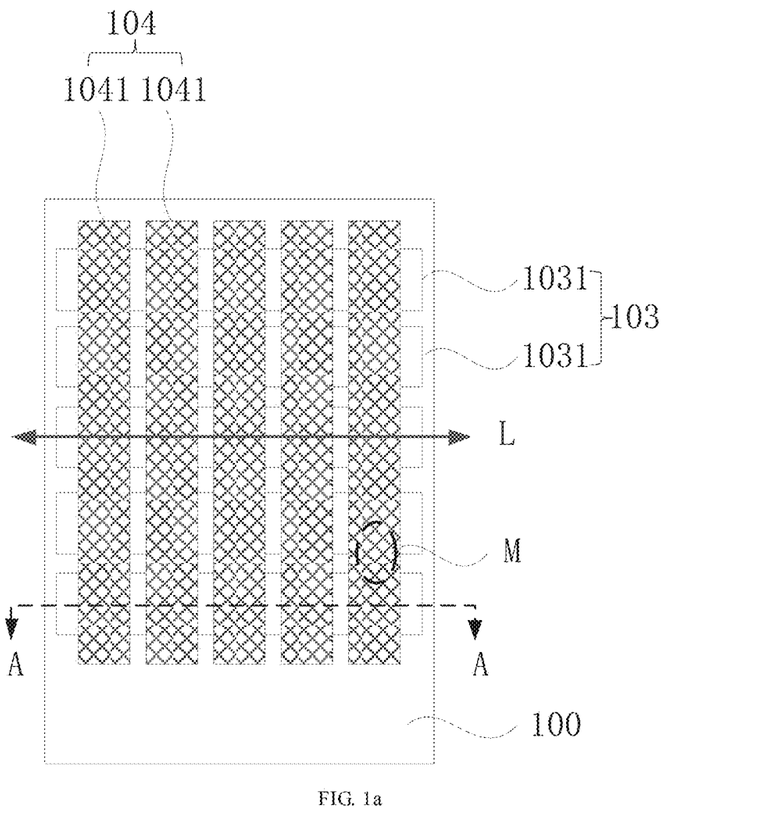
FIG. 1a is a schematic diagram showing a flexible touch display panel according to an embodiment of the present disclosure.
Figure 1B:
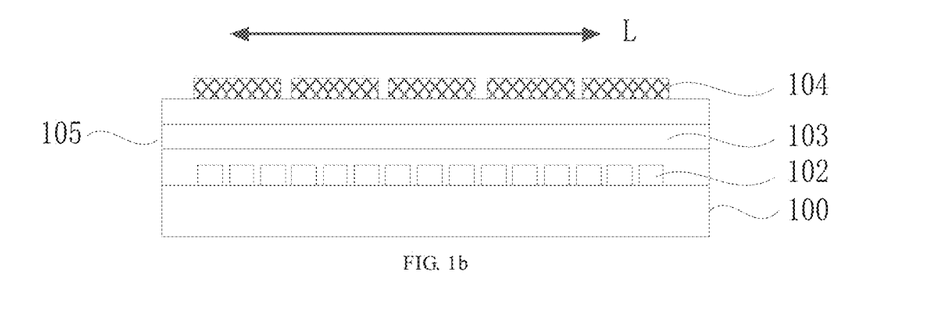
Figure 1C:
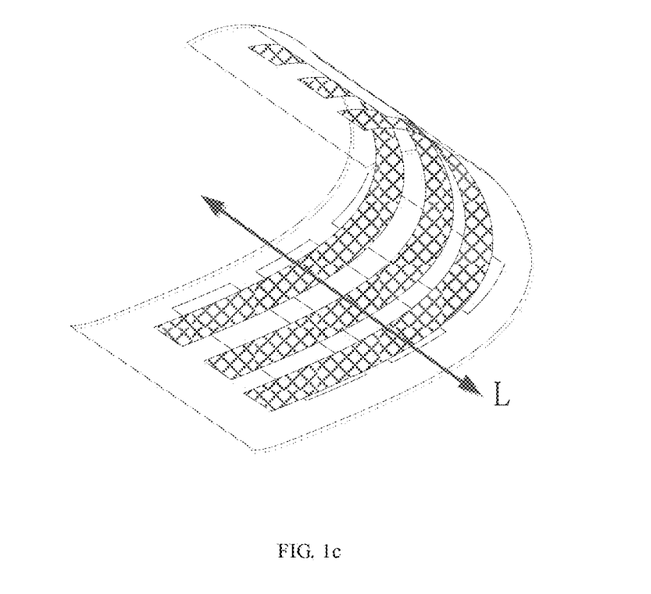
FIG. 1c is a cross-sectional diagram showing a situation in which a flexible touch display panel according to an embodiment of the present disclosure is bent about a curved axis.

FIG. 1a is a schematic diagram showing a flexible touch display panel according to an embodiment of the present disclosure, FIG. 1b is a cross-sectional diagram along A-A in FIG. 1a, and FIG. 1c is a schematic diagram showing a situation in which a flexible touch display panel according to an embodiment of the present disclosure is bent about a bending axis. As shown in FIG. 1a and FIG. 1b, the flexible touch display panel includes a flexible substrate 100; a light emitting unit layer disposed on the flexible substrate 100, the light emitting unit layer including a plurality of light emitting units 102; a first touch electrode layer 103; a second touch electrode layer 104; and an insulation layer 105 disposed between the first touch electrode layer 103 and the second touch electrode layer 104. The first touch electrode layer 103 is disposed on a side, which is facing away from the substrate 100, of the light emitting unit layer, and the second touch electrode layer 104 is disposed on a side, which is facing away from the light emitting units 102, of the first touch electrode layer 103.

The first touch electrode layer 103 includes a plurality of first touch electrodes 1031 which are insulated from each other, and the first touch electrodes 1031 are strip-shaped, extend along a bending axis L of the display panel and are arranged along a direction perpendicular to the bending axis L.

It is to be noted that the bending axis L of the flexible touch display panel is not a specific structure existing on the display panel, and the bending axis L indicates that the flexible display panel may be folded or bent about the bending axis L or a plurality of lines parallel to the bending axis L.

The second touch electrode layer 104 includes a plurality of second touch electrodes 1041 which are insulated from each other, and the second touch electrodes 1041 are strip-shaped, extend along a direction perpendicular to the bending axis L and are arranged along the bending axis L.

The first touch electrode layer 103 is a transparent conductive layer made of indium oxide, tin oxide or a mixture (indium tin oxide) thereof. The second touch electrode layer 104 is metal mesh made of silver or copper.

The flexible substrate 100 may be flexible and thus stretchable, foldable, bendable or curlable, so that the touch display panel may be stretchable, foldable, bendable or curlable. The flexible substrate 100 may be made of any suitable insulation material with flexibility, for example, a polymer material such as polyimide (PI), polycarbonate (PC), polyether sulfone (PES), polyethylene terephthalate (PET), polyethylene naphthalate (PEN), polyarylate (PAR) or glass fiber reinforced plastics (FRP). The flexible substrate 100 may be transparent, translucent or opaque.

A thin-film transistor array including a plurality of thin-film transistors is disposed on the flexible substrate 100. The thin-film transistor includes a semiconductor active layer, a gate electrode, a source electrode and a drain electrode. The semiconductor active layer includes a source region and a drain region formed by doping N-type impurity ions or P-type impurity ions. A region between the source region and the drain region is a channel region where no impurities are doped.

The light emitting units 102 are formed on the thin-film transistor array. Each of the light emitting units 102 includes an anode, a cathode, and a light emitting layer disposed between the anode and the cathode, and the anode is electrically connected with the drain electrode of the thin-film transistor. The light emitting layer may be made of low molecular weight organic materials or high molecular weight organic materials. The light emitting layer includes an organic emitter layer, and may further include at least one of a hole injection layer (HIL), a hole transport layer (HTL), an electron transport layer (ETL), and an electronic injection layer (EIL). However, in addition to the organic emitter layer, the light emitting layer may further include various other functional layers.

The cathode is disposed on the light emitting layer. Similar to the anode, the cathode may be formed as a transparent electrode or reflective electrode.

The light emitting layer emits a visible light if a voltage is applied between the anode and the cathode, thereby presenting an image that can be recognized by a user.

The flexible touch display panel may further include a thin-film encapsulation layer disposed on the light emitting units 102, configured to protect the light emitting layer and other thin layers from the influence of external moisture, oxygen and the like. The thin-film encapsulation layer may include an inorganic layer and an organic layer which are alternatively stacked.

The first touch electrode layer 103 and the second touch electrode layer 104 form a mutual capacitance type touch structure for detecting a touch position of the flexible touch display panel, realizing a human-computer interaction between the user and the display panel. As for the mutual capacitance type touch, a touch sensor electrode includes a touch driving electrode and a touch sensing electrode. That is to say, the first touch electrodes and the second touch electrodes may be used as the touch driving electrodes and the touch sensing electrodes, respectively. To detect the touch position, touch driving signals are sequentially input to the touch driving electrodes, while the touch sensing electrodes output detection signals, such that the touch driving electrodes and the touch sensing electrodes form a capacitor, and when the touch display panel is touched, a coupling between the touch driving electrode and the touch sensing electrode in the vicinity of the touch point may be affected, and thus the capacitance between the touch driving electrode and the touch sensing electrode is changed. A method of detecting a position of the touch point includes: the touch driving signals are input to the touch driving electrodes sequentially, and the touch sensing electrodes output the touch sensing signals at the same time so that the capacitance at an intersection of all the touch driving electrodes and the touch sensing electrodes, that is, the capacitance of the whole integrated touch display panel in a two-dimensional plane can be obtained, and coordinates of the touch point may be calculated according to data of a change quantity in two-dimensional capacitance of the touch display panel.

In the embodiment of the present disclosure, the first touch electrode layer 103 is closer to the light emitting units compared with the second touch electrode layer 104. The first touch electrode layer 103 adopts a transparent conductive layer, and the second touch electrode layer 104 adopts metal mesh. The metal mesh has characteristics of low impedance and high flexibility, and the transparent conductive layer is strip-shaped and is capable of shielding signals. In this embodiment of the present disclosure, the first touch electrode layer 103 close to the light emitting units adopts a transparent conductive layer and is capable of shielding the second control electrode layer 104 from signal interference of the display signals of the light emitting units, and thus the touch stability is guaranteed. The first touch electrode layer 103 includes a plurality of strip-shaped first touch electrodes 1031 extending along the bending axis L. Therefore, the strip-shaped first touch electrodes 1031 will not be broken due to bending during a process of bending the touch display panel. Although the extending direction of the strip-shaped second touch electrodes 1041 is perpendicular to the direction of the bending axis L, it is possible to guarantee that the flexible touch display panel has good flexibility since the second touch electrode layer 104 is made of the metal mesh. The structure of this embodiment of the present disclosure has a technical advantage of both good flexibility and touch stability.

Alternatively, the first touch electrodes 1031 are touch driving electrodes, the second touch electrodes 1041 are touch sensing electrodes, and touch driving signals are input to the touch driving electrodes, so that the touch driving electrodes have constant potentials without being interfered with by the display signals, and the touch sensing electrodes output the sensing signals. If the position of the touch point cannot be detected due to the interference of the display signals on the touch sensing signals, the second touch electrodes are provided as the touch sensing electrodes in the present embodiment, and the first touch electrodes can shield the second touch electrodes from the interference of the display signals, so that more accurate touch detection is realized.

Figure 2:
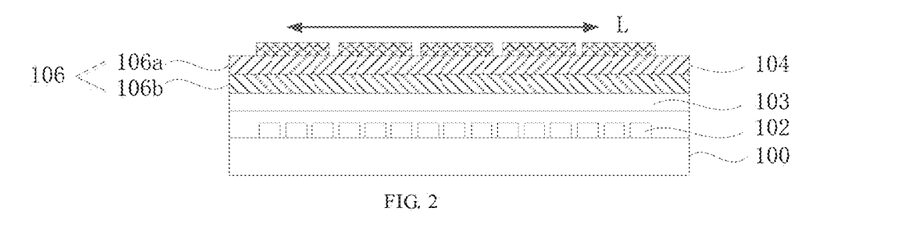
FIG. 2 is a cross-sectional diagram showing another flexible touch display panel according to an embodiment of the present disclosure.

FIG. 2 is a schematic diagram showing another flexible touch display panel according to an embodiment of the present disclosure. As shown in FIG. 2, the touch display panel further includes a polarizer 106 disposed between the first touch electrode layer 103 and the second touch electrode layer 104. Alternatively, the polarizer 106 may be a circular polarizer including a linear polarizer 106a and a quarter-wave plate 106b, where the linear polarizer 106a together with the quarter-wave plate 106b converts ambient light outside the touch display panel into circular polarized light, enabling the touch display panel to prevent visible effects of the ambient light outside it.

In the present embodiments, the first touch electrode layer and the second touch electrode layer are disposed on different sides of the polarizer, respectively, and the distance between the first touch electrode layer and the second touch electrode layer is increased, so that a greater touch signal strength is provided between the first touch electrode layer and the second touch electrode layer. Meanwhile, the first touch electrode layer and second touch electrode layer may use the polarizer as a substrate and a single touch substrate is omitted, so that the overall thickness of the touch display panel is further reduced.

Figure 3:
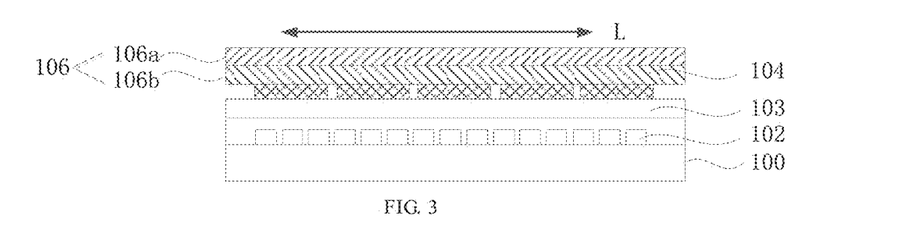
FIG. 3 is a schematic diagram showing yet another flexible touch display panel according to an embodiment of the present disclosure.

FIG. 3 is a schematic diagram showing another flexible touch display panel according to an embodiment of the present disclosure. As shown in FIG. 3, the first touch electrode layer 103 and the second touch electrode layer 104 are disposed between the polarizer 106 and the light emitting unit layer. Through disposing the first touch electrode layer 103 and the second touch electrode layer 104 between the polarizer 106 and the light emitting unit layer, the external ambient light, which is reflected by the second touch electrode layer after entering the display panel, cannot pass through the polarizer, thereby preventing the electrodes of the second touch electrode layer from being visible. Similarly, the first touch electrode layer and the second touch electrode layer may use the polarizer as a touch substrate, so that the single touch substrate is omitted, and the overall thickness of the touch display panel is further reduced.

Figure 4:
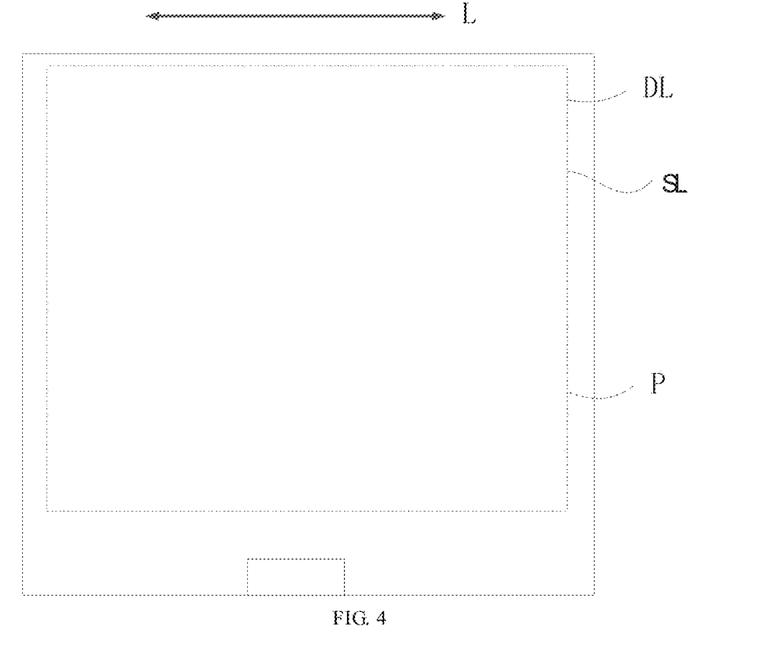
FIG. 4 is a schematic diagram showing a fourth flexible touch display panel according to an embodiment of the present disclosure.

FIG. 4 is a schematic diagram showing a fourth flexible touch display panel according to an embodiment of the present disclosure. As shown in FIG. 4, the flexible touch display panel further includes a plurality of scan lines SL and a plurality of data lines DL disposed on the flexible substrate. One end of each scan line SL is electrically connected with the gate of the thin-film transistor, and the other end of the scan line SL is connected with a gate controller, so as to control turn-on and turn-off of the thin-film transistor. One end of each data line is electrically connected with the source or the drain of the thin-film transistor, and the other end of the data line DL is connected with an integrated chip, so as to provide a data signal to the light emitting unit. The direction of the bending axis L is an extending direction of the scan lines SL, that is, the flexible touch display panel can be folded or bent about the scan lines. Through being folded or bent about the scan lines, the flexible touch display panel can prevent devices such as the integrated chip and a flexible circuit board in a non-display region from being damaged by bending.

Figure 5:
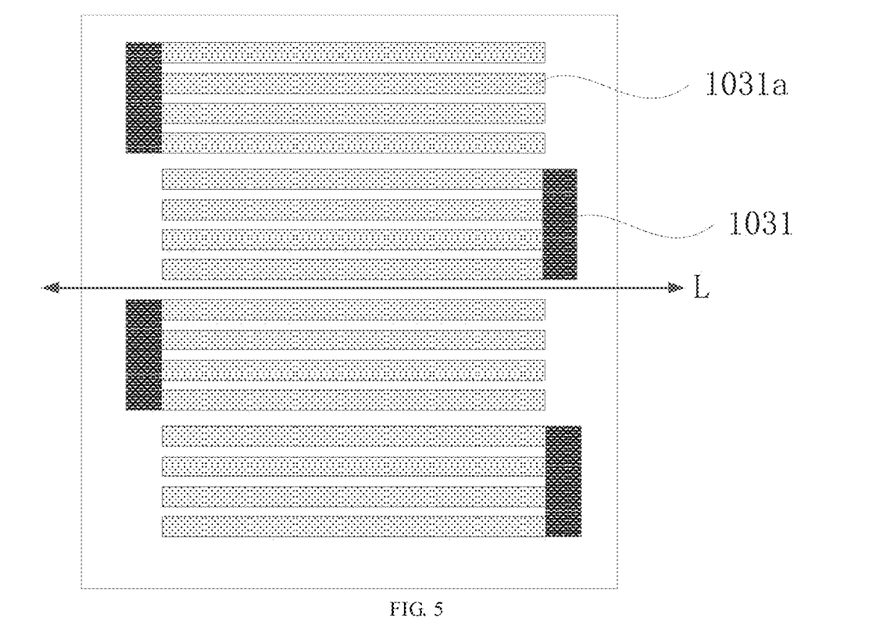
FIG. 5 is a schematic diagram showing a fifth flexible touch display panel according to an embodiment of the present disclosure.

FIG. 5 is a schematic diagram showing a fifth flexible touch display panel according to an embodiment of the present disclosure. As shown in FIG. 5, each first touch electrode 1031 includes a plurality of strip-shaped first touch sub-electrodes 1031a, where an extending direction of these first touch sub-electrodes 1031a is the same as that of the first touch electrode 1031, an arranging direction of these first touch sub-electrodes 1031a is the same as that of the first touch electrodes 1031, and these first touch sub-electrodes 1031a are electrically connected at ends of the first touch electrode 1031.

In the embodiments of the present disclosure, the bending resistance of the first touch electrode 1031 which is not resistant to bending is further enhanced by dividing the first touch electrode into a plurality of first touch sub-electrodes 1031a. This is because the dividing direction is the same as the direction of the bending axis L, and in the process of bending the touch display panel, the stress accumulation and transmission on the first touch electrode, which were originally subjected to a bending stress, in the direction perpendicular to the bending axis are relieved due to the pre-division of the first touch electrode 1031. Therefore, the bending reliability of the touch electrodes is guaranteed. It is to be noted that FIG. 5 schematically shows a situation where one first touch electrode is divided into four first touch sub-electrodes, while the specific division number will not be particularly limited in the present disclosure. The divided first touch sub-electrodes 1031a are electrically connected at ends of the first touch electrode 1031, and the plurality of first touch sub-electrodes have the same electrical signals to realize the effect of one touch electrode, so that read-in and read-out loads of the touch signals due to excessive touch electrodes are prevented. Alternatively, the plurality of first touch sub-electrodes 1031a are electrically connected at the ends of the first touch electrode 1031 by a metal which is more resistant to bending than a transparent metal oxide and has a lower resistance. Therefore, it is realized that the metal by which the plurality of first touch sub-electrodes are electrically connected may be located in a non-display region of the flexible touch display panel, so that the metal is prevented from reflecting the ambient light to enable the touch electrode to be visible. The plurality of first touch electrodes 1031 are connected with touch electrode leads by the metal at the ends, and the other ends of the touch electrode leads are connected with a flexible circuit board or an integrated circuit to realize the transmission of touch signals.

Figure 6:
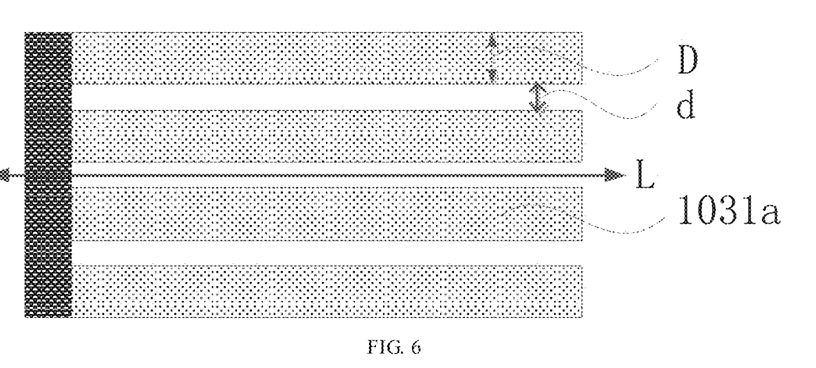
FIG. 6 is an enlarged schematic diagram showing one of first touch electrodes in FIG. 5.

Alternatively, FIG. 6 is an enlarged schematic view showing one of the first touch electrodes in FIG. 5. With reference to FIG. 6, in a first touch electrode 1031, an interval d between any adjacent first touch sub-electrodes along an arranging direction of the first touch sub-electrodes 1031a (namely, in a direction perpendicular to the bending axis L) is less than a width D of the first touch sub-electrodes.

Through setting the interval d between adjacent first touch sub-electrodes to be less than the width D of the first touch sub-electrodes, it is possible to increase the area of the first touch electrode to guarantee the touch accuracy of the entire touch display panel. Moreover, a good shielding effect for the display signals is ensured by setting a gap between the first touch sub-electrodes as small as possible, so that the second touch electrodes located at the upper layer are not interfered with by the display signals, and it is possible to guarantee that the touch display panel has a high touch accuracy. It is to be noted that the interval d between adjacent first touch sub-electrodes may be zero, that is, adjacent first touch sub-electrodes are in full contact, which does not affect the influence on the touch detection and has excellent shielding effect for the display signals.

Alternatively, the interval between the first touch sub-electrodes along the arranging direction of the first touch sub-electrodes is less than the width of the light emitting units. When the interval between the first touch sub-electrodes is greater or equal to the width of the light emitting elements, the shielding effect of the first touch electrode for the display signals is deteriorated, and it is not beneficial to improvement of the touch accuracy of the touch display panel, and the display unevenness is caused.

Alternatively, along the arranging direction of the first touch electrodes, the sum of the intervals between the plurality of first touch electrodes and the intervals between the plurality of first touch sub-electrodes is less than the sum of the widths of all the first touch sub-electrodes. Through such an arrangement, it is ensured that within a touch effective region (that is, within a region where the first touch electrodes are distributed), a total area of the touch electrodes is greater than that of interval regions. Therefore, the shielding effect of the first touch electrodes for the display signals can be improved while the touch sensitivity is ensured. Moreover, in a case that the above-described conditions are met, the first touch sub-electrodes are ensured to have a suitable width. If the width of the first touch sub-electrodes is too small, there is an excessive requirement for the process and open circuit will be easily caused, resulting in partial poor contact of the touch display panel. On the other hand, if the width of the first touch sub-electrodes is too large, the overall bending resistance of the entire first touch electrodes may be deteriorated.

Figure 7:
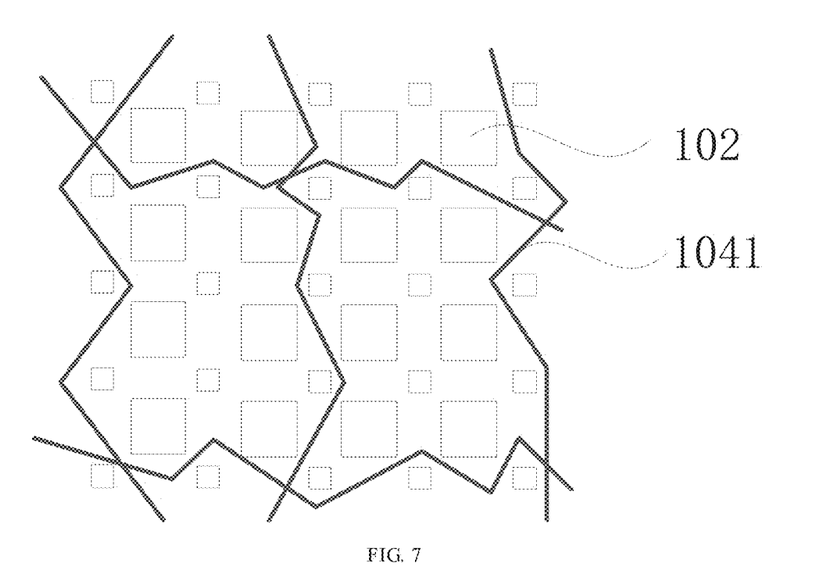
FIG. 7 is a partial enlarged schematic diagram showing one type of second touch electrodes of FIG. 1.
Figure 8:
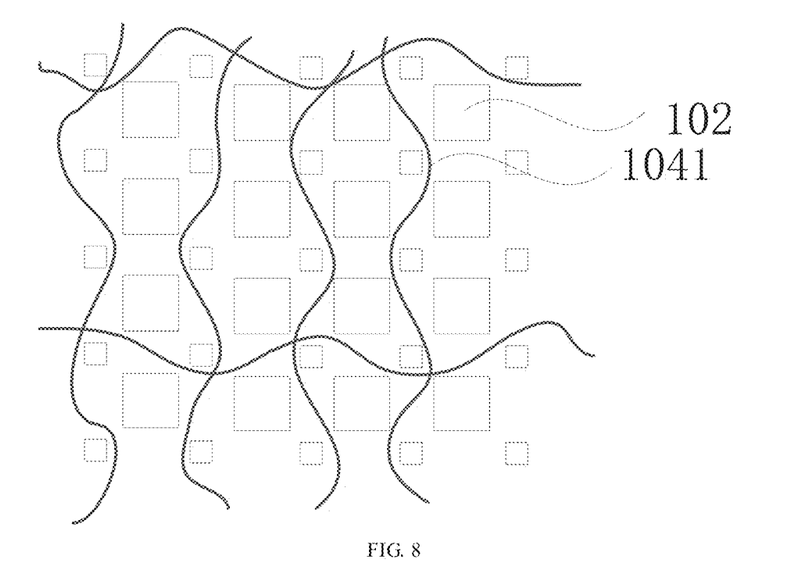
FIG. 8 is a partial enlarged schematic diagram showing another type of second touch electrodes of FIG. 1.

FIG. 7 is a partial enlarged schematic view showing a type of second touch electrode of FIG. 1, and FIG. 8 is a partial enlarged schematic view showing another type of second touch electrode of FIG. 1. As shown in FIG. 7 and FIG. 8, orthographic projections of the second touch electrodes 1041 on the light emitting unit layer 102 are positioned at intervals among the light emitting units 102. It is to be noted that FIG. 7 and FIG. 8 show a part of one second touch electrode, and the second touch electrode is made of metal mesh formed by crossing a plurality of metal wires with each other. Orthographic projections of the second touch electrode on the light emitting unit layer refer to orthographic projections of the plurality of metal wires of the metal mesh on the light emitting unit layer. When the orthographic projections of the plurality of metal wires are positioned within the intervals among the light emitting units 102, the second touch electrodes can be prevented from being visible, and thus the display effect of the touch display panel is improved. Alternatively, the plurality of metal wires are of a randomly-folded shape as shown in FIG. 7 or a wave shape as shown in FIG. 8. The randomly-folded shape and the wave shape prevent the metal mesh from having a regular arrangement, so that the second control electrodes are maximally prevented from being observed. On the other hand, the randomly-folded metal wires and the wavy metal wires have better flexibility and bending resistance in comparison with linear metal wires, and facilitate the overall bending reliability of the flexible touch display.

Figure 9:
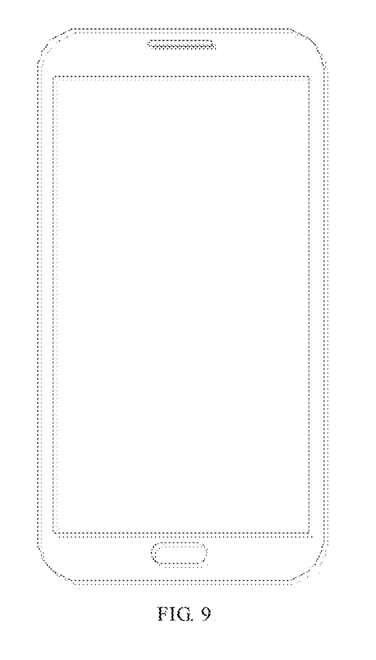
FIG. 9 shows a flexible touch display apparatus according to an embodiment of the present disclosure.

FIG. 9 shows a flexible touch display apparatus according to an embodiment of the present disclosure, including any one of the above-described touch display panels. The flexible touch display apparatus may be a mobile phone, a desktop computer, a notebook, a tablet, an electronic album, or the like. Since the touch display apparatus provided by the embodiment of the present disclosure includes the touch display panel as described above, the corresponding advantage of the above-described touch display panel is also provided correspondingly.

It is to be noted that various embodiments in the present specification are described in a progressive manner, each of the embodiments is mainly described in terms of differences from further embodiments, and identical and similar parts between various embodiments refer to each other.

The foregoing description of the disclosed embodiments will enable one skilled in the art to implement or use the present disclosure. Various modifications to these embodiments will be apparent to those skilled in the art, and generic principles defined herein may be embodied in other embodiments without departing from the spirit or scope of the present disclosure. Accordingly, the present disclosure will not to be limited to the embodiments shown herein, but to be accorded with the widest scope consistent with principles and novel features disclosed herein.

What is claimed is:

1. A flexible touch display panel, comprising:
   a flexible substrate;
   a light emitting unit layer disposed on the flexible substrate, wherein the light emitting unit layer comprises a plurality of light emitting units;
   a first touch electrode layer disposed on a side, which is facing away from the substrate, of the light emitting unit layer;
   a second touch electrode layer disposed on a side, which is facing away from the light emitting units, of the first touch electrode layer; and
   an insulation layer disposed between the first touch electrode layer and the second touch electrode layer;
   wherein the first touch electrode layer is a transparent conductive layer and comprises a plurality of first touch electrodes having a comb shape, the first touch electrodes extend along a bending axis of the flexible touch display panel and are arranged in a direction perpendicular to the bending axis, wherein each of the first touch electrodes comprises two ends opposite to each other along a direction parallel to the bending axis and a plurality of strip-shaped first touch sub-electrodes, an extending direction of the first touch sub-electrodes is the same as that of the first touch electrode, an arranging direction of the first touch sub-electrodes is the same as that of the first touch electrodes, the first touch sub-electrodes of the each of the first touch electrodes are electrically connected at an end of the each of the first touch electrodes and have same electrical signals to realize an effect of one touch electrode;
   for every two adjacent first touch electrodes directly adjacent to each other, the first touch sub-electrodes comprised in a same first touch electrode of the every two adjacent first touch electrodes are electrically connected at only one end of the same first touch electrode by metal located in a non-display region of the flexible touch display panel and the metal is electrically connected to one end of a touch electrode lead, the other end of the touch electrode lead is electrically connected to one of a flexible circuit board and an integrated to realize transmission of touch signals, the other end of the same first touch electrode is not connected with metal, ends of every two adjacent first touch electrodes at which the first touch sub-electrodes are electrically connected by the metal are disposed at different sides, teeth of one comb-shaped first touch electrode in every two adjacent first touch electrodes face towards a first direction and teeth of the other comb-shaped first touch electrode in the every two adjacent first touch electrodes face towards a second direction, and the first direction and the second direction are opposite to each other and are parallel to the bending axis; and wherein the second touch electrode layer is made of metal mesh and comprises a plurality of second touch electrodes, the second touch electrodes are strip-shaped, extend along the direction perpendicular to the bending axis and are arranged along the bending axis, wherein the metal mesh of the second touch electrodes has a plurality of metal lines, and the plurality of metal lines are of a randomly-folded shape, orthographic projections of the plurality of metal lines on the light emitting unit layer are positioned within intervals between the light emitting units.

2. The touch display panel according to claim 1, further comprising a plurality of scan lines and a plurality of data hues disposed on the flexible substrate, wherein the plurality of scan lines extend along the bending axis.

3. The touch display panel according to claim 1, wherein the interval between the first touch sub-electrodes along the arranging direction of the first touch sub-electrodes is less than a width of the light emitting units.

4. The touch display panel according to claim 1, wherein in the arranging direction of the plurality of first touch electrodes, a sum of an interval between the plurality of first touch electrodes and an interval between the plurality of first touch sub-electrodes is less than a sum of widths of all the first touch sub-electrodes.

5. The touch display panel according to claim 1, further comprising a polarizer disposed between the first touch electrode layer and the second touch electrode layer.

6. The touch display panel according to claim 1, further comprising a polarizer, wherein the first touch electrode layer and the second touch electrode layer are disposed between the polarizer and the light emitting unit layer.

7. The touch display panel according to claim 1, wherein the first touch electrodes are touch driving electrodes, and the second touch electrodes are touch sensing electrodes.

8. A flexible touch display apparatus comprising a flexible touch display panel, wherein the flexible touch display panel comprises:
a flexible substrate;
a light emitting unit layer disposed on the flexible substrate, wherein the light emitting unit layer comprises a plurality of light emitting units;
a first touch electrode layer disposed on a side, which is facing away from the substrate, of the light emitting unit layer;
a second touch electrode layer disposed on a side, which is facing away from the light emitting units, of the first touch electrode layer; and
an insulation layer disposed between the first touch electrode layer and the second touch electrode layer;
wherein the first touch electrode layer is a transparent conductive layer and comprises a plurality of first touch electrodes having a comb shape, the first touch electrodes extend along a bending axis of the flexible touch display panel and are arranged in a direction perpendicular to the bending axis, wherein each of the first touch electrodes comprises two ends opposite to each other along a direction parallel to the bending axis and a plurality of strip-shaped first touch sub-electrodes, an extending direction of the first touch sub-electrodes is the same as that of the first touch electrode, an arranging direction of the first touch sub-electrodes is the same as that of the first touch electrodes, the first touch sub-electrodes of the each of the first touch electrodes are electrically connected at an end of the each of the first touch electrodes and have same electrical signals to realize an effect of one touch electrode;

for every two adjacent first touch electrodes directly adjacent to each other, the first touch sub-electrodes comprised in a same first touch electrode of the every two adjacent first touch electrodes are electrically connected at only one end of the same first touch electrode by metal located in a non-display region of the flexible touch display panel and the metal is electrically connected to one end of a touch electrode lead, the other end of the touch electrode lead is electrically connected to one of a flexible circuit board and an integrated to realize transmission of touch signals, the other end of the same first touch electrode is not connected with metal, ends of the every two adjacent first touch electrodes at which the first touch sub-electrodes are electrically connected by the metal are disposed at different sides, teeth of one comb-shaped first touch electrode in the every two adjacent first touch electrodes face towards a first direction and teeth of the other comb-shaped first touch electrode in the every two adjacent first touch electrodes face towards a second direction, and the first direction and the second direction are opposite to each other and are parallel to the bending axis; and wherein the second touch electrode layer is made of metal mesh and comprises a plurality of second touch electrodes, the second touch electrodes are strip-shaped, extend along the direction perpendicular to the bending axis and are arranged along the bending axis, wherein the metal mesh of the second touch electrodes has a plurality of metal lines, and the plurality of metal lines are of a randomly-folded shape, orthographic projections of the plurality of metal lines on the light emitting unit layer are positioned within intervals between the light emitting units.

9. A flexible touch display panel, comprising:
a flexible substrate;
a light emitting unit layer disposed on the flexible substrate, wherein the light emitting unit layer comprises a plurality of light emitting units;
a first touch electrode layer disposed on a side, which is facing away from the substrate, of the light emitting unit layer;
a second touch electrode layer disposed on a side, which is facing away from the light emitting units, of the first touch electrode layer; and
an insulation layer disposed between the first touch electrode layer and the second touch electrode layer;
wherein the first touch electrode layer is a transparent conductive layer and comprises a plurality of first touch electrodes, the first touch electrodes are in strip-shaped and extend along a bending axis of the flexible touch display panel and are arranged in a direction perpendicular to the bending axis, wherein each of the first touch electrodes comprises two ends opposite to each other along a direction parallel to the bending axis and a plurality of strip-shaped first touch sub-electrodes, an extending direction of the first touch sub-electrodes is the same as that of the first touch electrode, an arranging direction of the first touch sub-electrodes is the same as that of the first touch electrodes, the first touch sub-electrodes of the each of the first touch electrodes are electrically connected at an end of the each of the first touch electrodes and have same electrical signals to realize an effect of one touch electrode;

for every two adjacent first touch electrodes directly adjacent to each other, the first touch sub-electrodes comprised in a same first touch electrode of the every two adjacent first touch electrodes are electrically connected at only one end of the same first touch electrode by metal located in a non-display region of the flexible touch display panel and the metal is electrically connected to one end of a touch electrode lead, the other end of the touch electrode lead is electrically connected to one of a flexible circuit board and an integrated to realize transmission of touch signals, the other end of the same first touch electrode is not connected with metal, ends of the every two adjacent first touch electrodes at which the first touch sub-electrodes are electrically connected by the metal are disposed at different sides, metal of one strip-shaped first touch electrode in the every two adjacent first touch electrodes is configured at one end of the one strip-shaped first touch electrode facing towards a first direction and metal of the other strip-shaped first touch electrode in the every two adjacent first touch electrodes is configured at one end of the other strip-shaped first touch electrode facing towards a second direction, and the first direction and the second direction are opposite to each other and are parallel to the bending axis;

wherein an interval between two adjacent first touch sub-electrodes in one of the first touch electrodes along the arranging direction of the first touch sub-electrodes is equal to zero;

wherein the second touch electrode layer is made of metal mesh and comprises a plurality of second touch electrodes, the second touch electrodes are strip-shaped, extend along the direction perpendicular to the bending axis and are arranged along the bending axis, wherein the metal mesh of the second touch electrodes has a plurality of metal lines, and the plurality of metal lines are of a randomly-folded shape, orthographic projections of the plurality of metal lines on the light emitting unit layer are positioned within intervals between the light emitting units.

\* \* \* \* \*